US008323396B2

(12) United States Patent
Hollman et al.

(10) Patent No.: US 8,323,396 B2
(45) Date of Patent: *Dec. 4, 2012

(54) ORANGE PEARLESCENT PIGMENTS

(75) Inventors: Aaron Hollman, Hebron, KY (US); Philippe Schottland, Wester Chester, OH (US); Jim Black, Loveland, OH (US)

(73) Assignee: Sun Chemical Corp., Parsippany, NJ (US)

( * ) Notice: Subject to any disclaimer, the term of this patent is extended or adjusted under 35 U.S.C. 154(b) by 1236 days.

This patent is subject to a terminal disclaimer.

(21) Appl. No.: 12/032,746

(22) Filed: Feb. 18, 2008

(65) Prior Publication Data

US 2009/0208436 A1    Aug. 20, 2009

Related U.S. Application Data

(63) Continuation-in-part of application No. 11/765,614, filed on Jun. 20, 2007, now Pat. No. 7,850,775.

(60) Provisional application No. 60/865,042, filed on Nov. 9, 2006.

(51) Int. Cl.
*C09C 1/00* (2006.01)
*B32B 5/16* (2006.01)
*B32B 9/00* (2006.01)
*B32B 15/02* (2006.01)
*B32B 17/02* (2006.01)
*B32B 23/02* (2006.01)
*B32B 19/00* (2006.01)

(52) U.S. Cl. ......... 106/418; 428/363; 428/402; 428/702

(58) Field of Classification Search ................. 106/31.6, 106/31.65, 1.9, 418, 428, 438, 456, 459; 428/363, 336, 402–405, 432, 447, 697, 699, 428/701, 702; 424/64, 69, 70.7; 423/171, 423/210, 212; 524/449

See application file for complete search history.

(56) References Cited

U.S. PATENT DOCUMENTS

| | | |
|---|---|---|
| 2,694,622 A | 11/1954 | Reed et al. |
| 3,087,829 A | 4/1963 | Linton |
| 3,874,890 A | 4/1975 | Bernhard et al. |
| 3,926,659 A | 12/1975 | Bernhard et al. |
| 3,931,025 A | 1/1976 | Woditsch et al. |
| 4,017,303 A | 4/1977 | Koester et al. |
| 4,146,403 A | 3/1979 | Armanini et al. |
| 4,435,220 A | 3/1984 | Watanabe et al. |
| 4,606,914 A | 8/1986 | Miyoshi |
| 4,622,074 A | 11/1986 | Miyoshi et al. |
| 4,701,221 A | 10/1987 | Brunn et al. |
| 4,702,775 A | 10/1987 | Ostertag |
| 4,744,832 A | 5/1988 | Franz |
| 4,838,648 A | 6/1989 | Phillips et al. |
| 4,867,793 A | 9/1989 | Franz et al. |
| 4,948,631 A | 8/1990 | Ostertag et al. |
| 5,009,711 A | 4/1991 | Emmert |
| 5,085,706 A | 2/1992 | Kuske |
| 5,164,005 A | 11/1992 | Kuske et al. |
| 5,208,081 A | 5/1993 | Gubitz et al. |
| 5,223,360 A | 6/1993 | Prengel et al. |
| 5,273,576 A | 12/1993 | Sullivan |
| 5,277,711 A | 1/1994 | Schmidt |
| 5,326,392 A | 7/1994 | Miller et al. |
| 5,356,471 A | 10/1994 | Reynders |
| 5,364,467 A | 11/1994 | Schmid |
| 5,368,639 A | 11/1994 | Hasegawa et al. |
| 5,374,306 A | 12/1994 | Schlegel |
| 5,449,403 A | 9/1995 | Andrean et al. |
| 5,472,491 A | 12/1995 | Duschek et al. |
| 5,486,354 A | 1/1996 | Defossez et al. |
| 5,486,631 A | 1/1996 | Mitchnick et al. |
| 5,496,544 A * | 3/1996 | Mellul et al. ................ 424/78.03 |
| 5,571,851 A | 11/1996 | Freeman et al. |
| 5,582,817 A | 12/1996 | Otsu et al. |
| 5,624,487 A | 4/1997 | Schmidt et al. |
| 5,695,747 A | 12/1997 | Forestier et al. |
| 5,718,754 A | 2/1998 | Macpherson et al. |
| 5,733,658 A | 3/1998 | Schmid et al. |
| 5,738,717 A | 4/1998 | Oulsnam et al. |
| 5,753,371 A | 5/1998 | Sullivan et al. |
| 5,759,255 A | 6/1998 | Venturini et al. |

(Continued)

FOREIGN PATENT DOCUMENTS

DE    22 15 191    3/1974

(Continued)

OTHER PUBLICATIONS

Jan Subrt, et al., "Uniform Particles with a Large Surface Area Formed by Hydrolysis of $Fe_2(SO_4)_3$ with Urea," Materials Research Bulletin, 1999, pp. 905-914, vol. 34, No. 6.

Miyoshi, "Overall Review of Surface Modification Technology," 2000, Reprint from PCI Asia.

Tan Junru, et al.; "The preparation and characteristics of a multi-cover-layer type, blue mica titania. pearlescent pigment," Dyes and Pigments, 2003, pp. 93-98, vol. 56.

Vaclav Stengl, et al., "The preparation and characteristics of pigments based on mica coated with metal oxides," Dyes and Pigments, Mar. 2003, pp. 239-244, vol. 58.

(Continued)

*Primary Examiner* — Pegah Parvini

(74) *Attorney, Agent, or Firm* — McKenna Long & Aldridge LLP

(57) ABSTRACT

An orange pearlescent pigment comprising a substrate and a first layer containing FeOOH, and a second layer containing $Fe_2O_3$ located between the substrate and the first layer. The color of the pigment is such that a homogeneous coating of the pigment, measured over a white background, has a CIELAB hue angle, $h_{ab}$, from about 40 to about 60 degrees, and the chroma value is greater than 50. The pigment may be used in a cosmetic, coating, or ink composition.

28 Claims, No Drawings

U.S. PATENT DOCUMENTS

| | | | |
|---|---|---|---|
| 5,932,197 A | 8/1999 | Arnaud | |
| 5,958,125 A | 9/1999 | Schmid | |
| 5,958,197 A | 9/1999 | Allen et al. | |
| 6,019,831 A | 2/2000 | Schmidt et al. | |
| 6,086,846 A | 7/2000 | Burow et al. | |
| 6,132,873 A | 10/2000 | Dietz et al. | |
| 6,139,614 A | 10/2000 | Schmid et al. | |
| 6,139,615 A | 10/2000 | Jones | |
| 6,190,445 B1 | 2/2001 | Noguchi | |
| 6,280,714 B1 | 8/2001 | Arnaud et al. | |
| 6,290,766 B1 | 9/2001 | DeLuca, Jr. | |
| 6,372,517 B1 | 4/2002 | Lange | |
| 6,416,573 B2 | 7/2002 | Horino et al. | |
| 6,428,773 B1 | 8/2002 | Oko | |
| 6,451,294 B1 | 9/2002 | Simon | |
| 6,485,556 B1 | 11/2002 | De Luca, Jr. | |
| 6,488,758 B2 | 12/2002 | Glausch et al. | |
| 6,541,032 B1 | 4/2003 | Medelnick et al. | |
| 6,589,331 B2 | 7/2003 | Ostertag et al. | |
| 6,596,070 B1 * | 7/2003 | Schmidt et al. | 106/417 |
| 6,616,745 B1 | 9/2003 | Narvarti et al. | |
| 6,620,233 B1 | 9/2003 | Seeger et al. | |
| 6,630,018 B2 | 10/2003 | Bauer et al. | |
| 6,632,275 B1 | 10/2003 | Schoen et al. | |
| 6,638,618 B2 | 10/2003 | Hayashi et al. | |
| 6,645,286 B2 | 11/2003 | Ostertag et al. | |
| 6,663,852 B2 | 12/2003 | Simon | |
| 6,689,205 B1 | 2/2004 | Bruckner et al. | |
| 6,689,206 B2 | 2/2004 | Meisen | |
| 6,692,561 B1 | 2/2004 | Schoen | |
| 6,719,837 B2 | 4/2004 | Bertaux | |
| 6,719,838 B2 | 4/2004 | Heider | |
| 6,743,285 B1 * | 6/2004 | Anselmann et al. | 106/415 |
| 6,759,097 B2 | 7/2004 | Phillips et al. | |
| 6,773,499 B2 | 8/2004 | Schoen et al. | |
| 6,781,022 B1 | 8/2004 | Katrib et al. | |
| 6,790,452 B2 | 9/2004 | Kishida et al. | |
| 6,818,299 B2 | 11/2004 | Phillips et al. | |
| 6,838,166 B2 | 1/2005 | Phillips et al. | |
| 6,875,264 B2 | 4/2005 | Zimmermann et al. | |
| 6,884,289 B2 | 4/2005 | Schoen | |
| 6,902,609 B2 | 6/2005 | Steffenino et al. | |
| 6,902,807 B1 | 6/2005 | Argoitia et al. | |
| 7,014,700 B2 | 3/2006 | DeLuca, Jr. et al. | |
| 7,019,048 B2 | 3/2006 | Brehm | |
| 7,122,245 B2 | 10/2006 | Morton-Finger | |
| 7,169,735 B2 | 1/2007 | Sagae | |
| 7,189,454 B2 | 3/2007 | Johnson et al. | |
| 7,226,503 B2 | 6/2007 | Anselmann | |
| 7,235,127 B2 | 6/2007 | Kunstmann et al. | |
| 7,238,424 B2 | 7/2007 | Raksha et al. | |
| 7,241,503 B2 | 7/2007 | Noguchi | |
| 7,258,900 B2 | 8/2007 | Raksha et al. | |
| 7,303,622 B2 | 12/2007 | Loch et al. | |
| 7,318,861 B2 | 1/2008 | Bagala, Sr. et al. | |
| 7,678,449 B2 | 3/2010 | Jones | |
| 7,850,775 B2 * | 12/2010 | Hollman et al. | 106/418 |
| 2002/0160194 A1 | 10/2002 | Phillips et al. | |
| 2003/0092815 A1 * | 5/2003 | Steudel et al. | 524/442 |
| 2003/0097965 A1 | 5/2003 | Heider | |
| 2003/0177950 A1 | 9/2003 | Schoen | |
| 2005/0142084 A1 | 6/2005 | Ganguly et al. | |
| 2005/0154082 A1 | 7/2005 | DeLuca, Jr. et al. | |
| 2005/0186423 A1 | 8/2005 | Johnson | |
| 2006/0070552 A1 | 4/2006 | Loch et al. | |
| 2006/0223910 A1 | 10/2006 | Bagala, Sr. | |
| 2007/0026299 A1 | 2/2007 | Park et al. | |
| 2007/0028799 A1 | 2/2007 | Kniess et al. | |
| 2007/0031683 A1 | 2/2007 | Morohashi et al. | |
| 2007/0034112 A1 | 2/2007 | Mronga | |
| 2008/0124575 A1 | 5/2008 | Hollman et al. | |
| 2008/0170830 A1 | 7/2008 | Guan et al. | |

FOREIGN PATENT DOCUMENTS

| | | |
|---|---|---|
| DE | 31 51 354 | 12/1981 |
| DE | 32 35 017 | 9/1982 |
| DE | 33 34 598 | 9/1983 |
| DE | 40 30 727 | 4/1992 |
| DE | 197 46 263 | 10/1997 |
| DE | 10 2006 060 997 | 7/2008 |
| EP | 0 090 259 | 3/1983 |
| EP | 0 290 908 | 11/1988 |
| EP | 0 632 109 | 1/1995 |
| EP | 0 634 459 | 1/1995 |
| EP | 0 649 886 | 4/1995 |
| EP | 0 913 431 | 5/1999 |
| EP | 1 666 541 | 6/2006 |
| JP | 58-164653 | 9/1983 |
| JP | 07-330948 | 12/1995 |
| WO | WO 96/32446 | 10/1996 |
| WO | WO 97/29059 | 8/1997 |
| WO | WO 99/57204 | 11/1999 |
| WO | WO 01/92425 | 12/2001 |
| WO | WO 2008/077487 | 7/2008 |
| WO | WO 2008/156948 | 12/2008 |

OTHER PUBLICATIONS

Junru Tan, et al.; "Preparation and conductive mechanism of mica titania conductive pigment," Dyes and Pigments, 2003, pp. 107-114, vol. 62.

Office Action dated Sep. 27, 2010 for U.S. Appl. No. 11/931,473.

Office Action dated Sep. 28, 2010 for U.S. Appl. No. 11/931,658.

Buxbaum, G. et al., Industrial Inorganic Pigments, 3$^{rd}$ Ed., Weinheim: Wiley-VCH Verlag GmbH & Co., KGaA (2005) pp. 7-50 and 195-273.

Harding, P.H. et al., "The role of adhesion in the mechanical properties of filled polymer composites," J. Adhesion Sci. Technol., vol. 11(4) (1997) pp. 471-493.

International Search Report dated Sep. 10, 2009 for Application No. PCT/US08/064243.

Written Opinion dated 09/10/2009 for PCT/US08/064243.

International Search Report dated Sep. 10, 2009 for Application No. PCT/US08/087640.

International Preliminary Report on Patentability and Written Opinion dated Aug. 24, 2010 for Application No. PCT/US2009/033201.

Junru, T. et al., The preparation and characteristics of a multi-coverlayer type, blue mica titania, pearlescent pigment, Dyes and Pigments, vol. 56 (2003) pp. 93-98.

Li, Y. et al., "Hydrothermal Synthesis of Ultrafine $\alpha$-$Fe_2O_3$ and $Fe_3O_4$ Powders," Materials Research Bulletin, vol. 33(6) (1998) pp. 841-844.

Ponjee, J.J. et al., "Chemical modification of surfaces," Philips Tech. Rev., vol. 44(3) (Jul. 1988) pp. 81-88.

Notice of Allowance dated Aug. 24, 2010 for U.S. Appl. No. 11/765,614.

Office Action dated Sep. 17, 2010 for U.S. Appl. No. 11/931,415.

Office Action dated Sep. 16, 2010 for U.S. Appl. No. 11/931,534.

Office Action dated Nov. 14, 2008 for U.S. Appl. No. 12/016,341.

Office Action dated May 11, 2009 for U.S. Appl. No. 12/016,341.

Office Action dated Nov. 19, 2009 for U.S. Appl. No. 12/016,341.

* cited by examiner

ORANGE PEARLESCENT PIGMENTS

CROSS REFERENCE TO RELATED APPLICATIONS

The present application hereby claims the benefit of and is continuation-in-part application of the non-provisional patent application Ser. No. 11/765,614, filed on Jun. 20, 2007, now U.S. Pat. No. 7,850,775, which claims priority to provisional patent application Ser. No. 60/865,042, filed on Nov. 9, 2006, the disclosure of which are hereby incorporated by reference in its entirety. The present application is related to co-pending and commonly-owned non-provisional applications Ser. Nos. 11/931,534, 11/931,415, 11/931,473, 11/931,658 filed on Oct. 31, 2007, the disclosure of which are hereby incorporated by reference in its entirety.

BACKGROUND

Along with gem stones (e.g., diamond, ruby, emerald, topaz, opal, jade), and precious metals (e.g., gold, silver, platinum), pearls are among the most prized possessions (or luxury items) for human beings for millenniums. Beside their natural beauty, the brilliant color and luster, they are often associated with social status and level of well-being. As a result, and not surprisingly, the trend of cosmetics makeup is to emulate or recreate these "natural" and "aesthetic" appearances of pearl, gem and precious metals with less expensive materials such as interference pigments (e.g., metal oxide coated mica). The most common types of pearlescent pigments are micronized titanium dioxide, metal oxide coated mica, metal oxide coated alumina, metal oxide coated silica, basic lead carbonate, bismuth oxychloride, and natural fish silver.

Metal oxide coated mica pigments are characterized by excellent optical, chemical, mechanical, toxicological, and environmental properties. Natural or synthetic mica, and alternative supports, such as aluminum flakes, or $SiO_2$ platelets, can be used alone, or as a support for titanium dioxide, iron oxide ($Fe_2O_3$ or $Fe_3O_4$), iron ferrocyanide (Iron Blue or Prussian Blue), tin oxide, and chromium oxide. The color space defined by these coated mica-based pigments is based on the type of coating (e.g. metal oxide, colorant, etc.) used, the layer thickness, and the number of coated layers.

Among pigments, orange is a difficult color to produce. Orange pigments have typically used cadmium, which is not environmentally friendly. Orange pearlescent pigments are especially rare. There are some pigments sold by Merck under the trade name "IRIO-DIN 500," however they are not pearl pigments having an orange color of high chroma. Merck found that mica or like substrates coated with ferric oxide alone fail to show any coincidence between the maximum Hunter color tone values of a and b and thus no pearl pigment having an orange color with a high chroma can be obtained, U.S. Pat. No. 6,190,445.

Another example of orange colored pearlescent pigments currently offered in the market is Paliocrom® Orange L 2800 (an iron-oxide coated aluminum based pigment) by BASF. The existing pearlescent products in the market typically have a low chroma, and a hue angle that is not close to 45 degrees.

Consequently, a need exists for orange pearlescent pigments with a high chroma.

BRIEF SUMMARY OF THE INVENTION

The invention overcomes the above-noted and other deficiencies of the prior art by providing a pearlescent pigment comprising a substrate, a first layer containing FeOOH, and a second layer containing $Fe_2O_3$ located between the substrate and the first layer.

Another aspect of the invention is a process for making a pearlescent pigment comprising providing a substrate coated with a second layer containing $Fe_2O_3$, and coating a first layer containing FeOOH on the second layer.

Another aspect of the invention is a pearlescent pigment, wherein the pigment is an inorganic material and the color of a homogeneous coating of the pigment, measured over a white background, has a CIELAB hue angle, $h_{ab}$, from about 40 to about 60 degrees, and the chroma value is greater than 50.

Another aspect of the invention is a cosmetic composition containing a pearlescent pigment comprising a substrate and a first layer containing FeOOH, and a second layer containing $Fe_2O_3$ located between the substrate and the first layer.

Another aspect of the invention is a coating or ink composition containing a pearlescent pigment comprising a substrate and a first layer containing FeOOH, and a second layer containing $Fe_2O_3$ located between the substrate and the first layer.

These and other objects and advantages of the present invention shall be made apparent from the accompanying description.

DETAILED DESCRIPTION OF THE INVENTION

The present invention relates to a pearlescent pigment comprising a substrate, a first layer containing FeOOH, and a second layer containing $Fe_2O_3$ located between the substrate and the first layer.

Iron oxide coated substrates exhibit intensely colored pearlescent pigments with high luster. Varying the substrate and the iron oxide layer thickness will change the color, luminosity, and transparency of the pigment. The mean thickness of the second layer may be from about 1 nm to about 350 nm, from about 10 nm to about 350 nm, or from about 10 nm to about 250 nm.

The synthesis of a particular colored pearlescent pigment begins with selection of the proper substrate material. The substrate may be comprised of natural mica, synthetic mica, glass flakes, $Al_2O_3$ platelets, $SiO_2$ platelets, BiOCl, borosilicate, synthetic alumina, and boron nitride. Such substrates may be multilayer materials, i.e. include materials of different refractive indices. The substrate may comprise mica. The pearlescent pigment may comprise a mixture of different substrates. Furthermore, the substrate may be made of identical or different flakes which differ in particle size.

Preparation of the $Fe_2O_3$ layer adjacent to the substrate may be achieved by a number of known processes. Deposition of $Fe_2O_3$ surface layers may be achieved by precipitation of FeOOH or various iron oxides followed by annealing at temperatures ranging between 400 to 1100° C. This process is described in detail in U.S. Pat. Nos. 3,087,829 and 3,926,659. The color associated with $Fe_2O_3$ coated platelet-like pigments is determined by the interplay of light interference and absorption. Through precise control of the $Fe_2O_3$ layer, lustrous metallic effects can be produced ranging from bronze to copper and from copper to sienna.

The most vibrant orange shades can be produced when the pigment following initial $Fe_2O_3$ deposition has a bronze appearance. Commercial examples of $Fe_2O_3$ coated substrates are SunPearl® Bronze and SunShine® Super Bronze by SunChemical. The color of the pigment prior to the coating of the first layer containing FeOOH has a CIELAB hue angle, $h_{ab}$, of from about 20 to about 65 degrees. The chroma may be from about 25 to about 45. The L* may be from about 40 to about 65. The hue angle, $h_{ab}$, may be from about 45 to about 65 degrees, or from about 58 to about 61.

The layer containing FeOOH may be formed by homogeneous hydrolysis based on the decomposition of urea at elevated temperatures (80-100° C.) in the presence of an Fe(III) halide. Examples of Fe(III) halides are: iron(III) halides, and iron(III) sulfate, iron(III) carbonates, iron(III) phosphates. This process is described in U.S. Pat. No. 3,926,659. However, it was not known that FeOOH deposition via the urea process or other comparable processes could be applied to calcined $Fe_2O_3$-coated platelet-like substrates, or that it would produce vibrant orange pearlescent shades with excellent hiding power. In one embodiment, the iron of the first layer is from about 10 to about 20 weight percent of the pigment. In another embodiment, the iron of the first layer is from about 12 to about 18 weight percent of the pigment, or from about 13 to about 15 weight percent of the pigment.

In situ ammonia generated by the urea process reacts with ferric chloride resulting in the formation of the hydrolytic product $Fe(OH)_3$ on the surface of the $Fe_2O_3$ coated laminar substrate which is present in the form of an aqueous solid suspension. This homogeneous hydrolysis process is considerably slower than traditional techniques involving hard bases, such as alkali metal hydroxides (NaOH, etc.), and results in more uniform surface coating of the metal oxide film. The pH profile is controlled via the concentration of urea relative to the other reactants and the reaction temperature. As the decomposition of urea proceeds, a gradual increase in pH occurs resulting in FeOOH precipitation and eventual film growth on the surface of the $Fe_2O_3$-coated support. The thickness of the iron hydroxide layer is a critical factor influencing the optical properties of the resulting pigment. This parameter is controlled via the mass ratio of elemental Fe to pigment used in the reaction solution. The reaction conditions for the formation of a uniform layer of specific color and luster can be readily determined for any suitable substrate by routine experimentation. In one embodiment the pH is increased to a range of about 6 to about 8.

Following iron hydroxide deposition, coated pigments may be recovered via filtration and water washed to remove residual urea. The recovered filter cake may be then dried at 80° C. yielding a platelet-like substrate containing an inner calcined layer of $Fe_2O_3$, an outer uncalcined layer of FeOOH characterized by a lustrous, vibrant orange pearlescent appearance. In one embodiment, the pigment coated with the FeOOH is not heated above 300° C.

The mean particle size of the pigment may be in the range of about 5 to about 300 μm. The width may be about 9 to about 750 μm with a thickness of less than about 5 μm, the thickness may be about 1 μm or less. The pigment may have a mean particle size of about 9 to about 50 μm, or about 5 to about 750.

In order to improve the light, water repellency, weather stability, texture, and dispersion ability, it is frequently advisable to subject the finished pigment to surface treatment, depending on the area of application. Examples of surface treatments are methicone poly(oxy(methylsilylene))), metal soap, fatty acid, hydrogenated lecithin, dimethicone(polydimethylsiloxane), fluorinated compounds, amino acids, N-acylamino acids, glyceryl rosinates, silanes, and combinations. Many of the processes are described in U.S. Pat. Nos. 6,790,452; 5,368,6.39; 5,326,392; 5,486,631; 4,606,914; 4,622,074; German Patent 22 15 191; DE-A 31 51 354; DE-A 32 35 017; DE-A 33 34 598; DE 40 30 727 A1; EP 0 649 886 A2; WO 97/29059; WO 99/57204; U.S. Pat. No. 5,759,255; EP 0090259; EP 0 634 459; WO 99/57204; WO 96/32446; WO 99/57204; U.S. Pat. Nos. 5,759,255; 5,571,851; WO 01/92425; U.S. Pat. No. 5,472,491 J. J. Ponjee, Philips Technical Review, Vol. 44, No. 3, 81 ff; and P. H. Harding J. C. Berg, J. Adhesion Sci. Technol. Vol. 11 No. 4, pp. 471-493. This post-coating may further increase the chemical stability or simplify handling of the pigment, in particular incorporation into various media. In order to improve the wettability, dispersibility and/or compatibility with the user media, functional coatings of $Al_2O_3$ or $ZrO_2$ or mixtures thereof may be applied to the pigment surface.

In one embodiment, coupling agents may be used to form an outer layer on the pearlescent pigment. Suitable coupling agents are disclosed in EP 632 109. Examples include, silanes, zirconium aluminates, zirconates, and titanates. The silanes may possess the structure $Y-(CH_2)_n-SiX_3$ in which n is 2-8, Y is an organofunctional group, e.g. an amino, methacrylic, vinyl, alkyl, aryl, halogen and/or epoxy group, and X is a silicon-functional group which following its hydrolysis reacts with active sites of an inorganic substrate or by condensation with other silicon compounds. This group Y may comprise, for example a hydroxy, a halogen or an alkoxy group.

In addition to these substantially hydrophilic coupling agents, it is also possible to use hydrophilic silanes, especially the aryl-, alkyl- and fluoroalkyl-substituted di- and trimethoxysilanes. These include, for example, phenethyltrimethoxysilane, propyltrimethoxysilane, butyltrimethoxysilane, isobutyltrimethoxysilane, hexyltrimethoxysilane, octyltrimethoxysilane, 1H,1H,2H,2H-perfluorodecyltrimethoxysilane and (3,3,3-trifluoropropyl)methyldimethoxysilane. The concentration of coupling agents may be 0.2-1.2% by weight with respect to the base pigment.

In one embodiment the pearlescent pigment is an inorganic material and the color of a homogeneous coating of the pigment, measured over a white background, has a CIELAB hue angle, $h_{ab}$, from about 40 to about 60 degrees, and the chroma value is greater than 50. The CIELAB hue angle, $h_{ab}$, may be from about 50 to about 56 degrees, and the chroma value may be greater than about 52.

In another embodiment, the pearlescent pigment has a hiding power index (HPI) of greater than about 4 when measured in a 76 μm thick film formed from 10 wt % of the pigment in acrylic enamel. Pigments with a high HPI make them excellent for use in automotive coatings that require the pigment to fully hide the base coat. In another embodiment, the HPI may be less than about 1.

In one embodiment a cosmetic composition contains the pearlescent pigment. The cosmetic composition may be useful for make-up products for the skin, the eyes, or hair. Examples of compositions intended as make-up for the skin include eye shadows, eye liners, mascaras, body or face powder, foundations, blushes, colored creams, nail polish, lipsticks, lip gloss, hair or body gel, hair or body wash, cover sticks, lotion, concealer and foundation. Examples of cosmetic applications involving the lip area, are lip gloss, lipstick, and other lip compositions. Nail polish may be referred to as nail varnish, or nail enamel.

Pearlescent pigments may be used to produce a makeup cosmetic as described in U.S. Pat. Nos. 6,663,852, 6,451,294, and 6,280,714.

General cosmetic compositions may contain preservatives, stabilizers, neutralizing agents, aqueous-phase thickeners (polysaccharide biopolymers, synthetic polymers) or fatty-phase thickeners, such as clay minerals, fillers, perfumes, hydrophilic or lipophilic active substances, surfactants, antioxidants, film-forming polymers and mixtures thereof. The amounts of these various ingredients are those conventionally employed in the fields in question and, for example, may be from 0.01 to 30% of the total weight of the composition. In one embodiment, the cosmetic composition may further comprise a binder wherein the pigment represents about 0.5% to about 99.5% of the composition.

Lip cosmetic composition may comprise any ingredient usually used in the field concerned, such as water, preferably in an amount ranging from 0 to 95% of the total weight of the composition, water-soluble or liposoluble dyes, antioxidants, essential oils, preserving agents, fragrances, neutralizing agents, liposoluble polymers, in particular hydrocarbon-based polymers such as polyalkylenes or polyvinyl laurate, gelling agents for an aqueous phase, gelling agents for a liquid fatty phase, waxes, gums, surfactants, additional cosmetic or dermatological active agents such as, for example, emollients, moisturizers (for example glycerol), vitamins, liquid lanolin, essential fatty acids, lipophilic or hydrophilic sunscreens, and mixtures thereof. The composition may also contain lipid vesicles of ionic and/or nonionic type. These ingredients (other than the water) may be present in the composition in a proportion of from 0 to 20% of the total weight of the composition.

Luster pigments of this type are useful for many purposes, including coloring plastics, glasses, ceramic products, cosmetic preparations, coatings and inks.

In one embodiment a coating or ink composition contains the pearlescent pigment. In another embodiment an article comprises the pearlescent pigment. A coating, ink, or article may further comprise a binder, wherein the pigment represents about 0.5% to about 99.5% of the composition, about 0.1% to about 70%, or about 0.2% to about 10%.

The coating or ink may be printing ink, surface coating, coatings for laser marking, pigment preparation, dry preparation, food colorant, textile coating, architectural coating, synthetic fiber, or fiber based product. A coating may be applied to an object as a liquid, vapor, or solid. Examples of methods for applying a coating are by printing, painting, polymeric coating, or spraying. The coating may be a powder, enamel, aerosol, paint, epoxy, or polymer.

The arts of making coatings and inks, as well the various printing processes (i.e., intaglio, flexo, screen, offset, gravure) are very well known in the literatures, so it is not repeated here [see "The Printing Ink Manual", 5$^{th}$ edition, R. H. Leach, ed. Taylor & Francis, Inc.]. Other less common printing processes include digital offset solutions such as the Hewlett-Packard Indigo presses.

Besides the topical applications such as printings or coatings, the pigments can be incorporated directly into substrates during the formation stage to make an article. For example, during the formation of paper, the pigments can be introduced along with other regular paper fillers such as calcite, talc during paper making to fill the open pores of paper near the surface. If the article is a plastic, the pigment can be introduced during the extrusion of substrate. Examples of articles are plastic, glass, ceramic material, concrete, pressed wood, pills, paper, toothpaste, food products, food colorants, textiles, synthetic fibers, fiber based products, carpets, or agricultural products.

The terms goniochromatic, iridescent, and pearlescent, may be used interchangeably to mean a change of color depending on the viewing angle.

Unless otherwise specified, the HPI, CIELAB coordinates, hue angle, $h_{ab}$, $L^*$, $a^*$, $b^*$, and chroma of a pigment are measured using the pigment drawdown described in Example 3 with a white or black background using a D65 illuminant and a 10 degree observer.

A homogeneous coating of a pigment is a coating that only contains one colored element, it is not a blend of colored elements. An example of a pigment that will not form a homogeneous coating is Cloisonné® Nu Antique Gold pigment, the pigment contains both color pigment and iron oxide.

While an orange pearlescent pigment has been illustrated by description of several embodiments and while the illustrative embodiments have been described in considerable detail, it is not the intention of the applicant to restrict or in any way limit the scope of the appended claims to such detail. Additional advantages and modifications may readily appear to those skilled in the art.

EXAMPLES

Example 1

Preparation of Natural Mica Based Orange Pearlescent Pigment (10-60 Micron)

A solution containing 1097.7 kg water, 12.93 kg hydrochloric acid (20° Be), 52.9 kg of 38.4 wt % $FeCl_3$ solution (Kemira), 304.9 kg prilled urea (PCS Sales) and 63.5 kg $Fe_2O_3$ coated natural mica pigment (SunPearl Bronze, SunChemical, C84-6281, see Table 1 for composition) is charged to a 500 gallon jacketed pot reactor under agitation at 180 rpm. This initial solution has an approximate pH of 1.8. The solution is then heated to 90° C. to promote the decomposition of urea and a subsequent rise in pH. After about 1 hour at 90° C., the solution pH rises to approximately 6.3-6.5 indicating completion of the batch. For work up, the pigment is filtered, rinsed with water and dried at 80° C.

An intensely colored, lustrous orange pearlescent pigment is obtained. The resulting pigment is comprised of natural mica containing an inner layer of $Fe_2O_3$ and a surface layer of FeOOH.

TABLE 1

Composition of starting substrates (Supplied by SunChemical)

| Trade Name | Chemical Composition (wt %) | | | Particle Size Distribution (µm) |
| --- | --- | --- | --- | --- |
| | Natural Mica | Synthetic Fluorphlogopite | $Fe_2O_3$ | |
| SunPEARL Bronze | 65-69 | 0 | 29-35 | 10-60 |
| SunSHINE Super Bronze | 0 | 58-73 | 27-42 | 9-45 |

Example 2

Preparation of Synthetic Mica Based Orange Pearlescent Pigment (9-45 Micron)

Pigment is prepared in the same manner as described in Example 1 except that the starting platelet-like substrate was $Fe_2O_3$-coated synthetic fluorphlogopite (SunShine Super Bronze, SunChemical, C84-6282, see Table 1 for composition). An intensely colored, lustrous orange pearlescent pigment is obtained. The resulting pigment is comprised of synthetic fluorphlogopite (or synthetic mica) containing an inner layer of $Fe_2O_3$ and a surface layer of FeOOH.

Example 3

Evaluation of Optical Properties

Pigment drawdowns corresponding to Examples 1 and 2 were prepared by dispersing 0.5 g of pigment in 4.5 g of vehicle (10% CAB 531-1 (Eastman Chemical) in n-butyl acetate) at 3000 rpm for 3 minutes using a DAC150FVZ-K model (Hauschild Engineering) high speed mixer. The pigment suspension was then applied to an opacity card (Leneta Form 3B) using a 3 mil (~76 micron) Bird applicator. CIELab values measured for the pigment prepared in Examples 1 and 2 with a Spectraflash SF600 Plus spectrophotometer (9 mm aperture) over a black and white background are shown in Table 2.

TABLE 2

CIELab values measured for Examples 1 and 2 using a 10° observer and D65 illuminant with specular component included (9 mm aperture)

| | White Background | | | | | Black Background | | | | | |
|---|---|---|---|---|---|---|---|---|---|---|---|
| Example | L value | a value | b value | Chroma | Hue Angle | L value | a value | b value | Chroma | Hue Angle | HPI |
| 1 | 56.5 | 30.2 | 44.1 | 53.4 | 55.6 | 56.24 | 28.4 | 43.63 | 52.1 | 56.9 | 4.0 |
| 2 | 51.9 | 35.0 | 44.0 | 56.3 | 51.5 | 50.5 | 32.8 | 41.9 | 53.3 | 51.9 | 0.74 |

As shown, both Examples 1 (natural mica base) and 2 (synthetic mica based) are highly chromatic, lustrous pearlescent orange shades. The chroma exhibited is equivalent or better than examples found in U.S. Pat. No. 6,190,445 and does not involve the use of potassium and/or aluminum and/or calcium and/or magnesium salt prior to ferric salt precipitation. Furthermore, the examples described in the current method are distinguished by their significantly higher "a" coordinate resulting in a more desirable redder orange appearance. This feature is unique relative to U.S. Pat. No. 6,190,445 and commercially available Paliocrom® Orange L 2800 (an iron-oxide coated aluminum based pigment) by BASF. Only Example 2 from U.S. Pat. No. 6,190,445 exhibits an "a" coordinate greater than 30 and its corresponding chroma (C*=49.8) is significantly less than each example in the current application.

Example 4

Clear Gel Lip Gloss Preparation

The constituents of the clear gel lip gloss base shown in Table 3 are mixed homogeneously and heated to 80° C. Following sufficient cooling to room temperature, the pigment from Example 1 was added at 2 wt % to the base gel and mixed thoroughly.

TABLE 3

Composition of clear gel lip gloss base

| Ingredients | Weight Fraction (%) |
|---|---|
| Versagel ME750 (Penreco) | 81.5 |
| Ceraphyl 368 (Sblack, ISP) | 10 |
| Ceraphyl 55 (ISP) | 5 |
| Isostearyl Isostearate (Mosselman) | 3 |
| Germaben (Clariant) | 0.5 |

Example 5

Eye Shadow Cream

Xanthan gum and magnesium aluminum silicate were dispersed into deionized water using high shear mixing until the mixture was smooth, to form Phase A. Triethanolamine, propylene glycol, and a water soluble preservative (Phase B) were added to the smooth gum mixture of Phase A and mixed until smooth. Stearic acid, glyceril stearate, and oleyl alcohol were heated to 75±5° C. with gentle agitation, to form Phase D.

The pearlescent pigment material (Phase C) was added to the Phase A-B mixture with gentle agitation, and maintained at a temperature of 75±5° C. Phase D was added to the Phase A-B-C mixture with gentle agitation, while maintaining a temperature of 75±5° C. A constant agitation was maintained and the overall mixture was cooled to 35±5° C.

The resulting eye shadow cream is a shimmering red-orange shade with gold, red and green iridescent sparkling points, depending on the viewing angle.

TABLE 4

Composition of the eye shadow cream

| Ingredients | Weight Fraction (%) |
|---|---|
| Phase A | |
| Water | (q.s. to 100%) 65.10 |
| Magnesium Aluminum Silicate | 1.00 |
| Xanthan Gum | 0.30 |
| Phase B | |
| Triethanolamine (TEA 99%) | 0.30 |
| Propylene Glycol | 8.00 |
| Preservative (Water soluble) | q.s. |
| Phase C | |
| Example 1 | 20.00 |
| Phase D | |
| Stearic Acid (Stearic Acid 94%) | 4.00 |
| Glyceril Stearate | 0.80 |
| Oleyl Alcohol | 0.50 |

Example 6

Pressed Powder

Talc, dimethicone/dimethicone crosspolymer, and preservatives were thoroughly blended and dispersed using appropriate dry blending/dispersing equipment. The pearlescent pigment material of Phase B was added to the dry blended ingredients and mixed until uniform.

The resulting press powder is characterized by a lustrous, red-shade orange pearlescent appearance with gold, red and green iridescent sparkling points depending on the viewing angle.

TABLE 5

Composition of the pressed powder

| Ingredients | Weight Fraction (%) |
|---|---|
| Phase A | |
| Talc | 45-80 (q.s to 100) |
| Dimethicone and Dimethicone Crosspolymer | 5.00 |
| Preservatives | (q.s to 100) |
| Phase B | |
| Example 1 | 15.00-50.00 |

Example 7

Nail Polish

Pearlescent pigment (5 parts) was mixed with the nail polish base (95 parts, see Table 6) in an appropriate size vessel fitted with a Lightning™ type propeller mixer. The components were mixed until uniform.

The resulting nail enamel and nail laquer is characterized by a high-chroma lustrous, red-shade orange pearlescent appearance with gold, red and green iridescent sparkling points depending on the viewing angle.

TABLE 6

Nail polish base

| Ingredients | Weight Fraction (%) |
|---|---|
| Butyl Acetate | 25-50 |
| Ethyl Acetate | 10-25 |
| Nitrocellulose | 10-25 |
| Acetyl Tributyl Citrate | 5-10 |
| Phtalic Anhydride/Trimellitic Anhydride/Glycol Copolymer | 5-10 |
| Isopropyl Alcohol | 5-10 |
| Stearalkonium Hectorite | 1-5 |
| Adipic Acid/Fumaric Acid/Phtalic Acid/Tricyclodecane Dimethanol Copolymer | 1-5 |
| Citric Acid | <0.1 |

Example 8

High Gloss, Colored Lipstick

Castor oil, isononyl isononanoate, pentaerythrityl tetracaprylate/tetracaprate, octyldodecanol, lanolin oil, caprylic/capric/stearic triglyceride, candelilla wax, carnauba wax, polybutene H-100, ozokerite, lanolin wax, red 7 lake, preservative, and antioxidant were all weighed and placed into a heated vessel. The temperature was raised to 85±3° C. The ingredients were stirred until they were melted and uniform.

The pearlescent pigment of Phase B was dispersed in the castor oil of Phase A then milled in either a colloid or roller mill. The dispersed pigment was then added and mixed with the remainder of Phase A. The fragrance of Phase C was then added and mixed with constant stirring. The composition was poured at 75±5° C. then molded, cooled, and flamed into lipstick.

The resulting lipstick is characterized by a high-chroma lustrous, red-shade orange pearlescent appearance.

TABLE 7

Composition of the high gloss, colored lipstick

| Ingredients | Weight Fraction (%) |
|---|---|
| Phase A | |
| Castor Oil | (q.s to 100%) 14.56 |
| Isononyl Isononanoate | 17.51 |
| Pentaerythrityl TetraCaprylate/Tetracaprate | 8.75 |
| Octyldodecanol | 5.47 |
| Lanolin Oil | 11.93 |
| Caprylic/Capric/Stearic Triglyceride | 7.11 |
| Candelilla Wax | 9.30 |
| Carnauba Wax | 3.28 |
| Polybutene H-100 | 7.66 |
| Ozokerite | 2.20 |
| Lanolin Wax | 1.09 |
| Red 7 Lake | 0.80 |
| Preservative | q.s. |
| Antioxidant | q.s. |
| Phase B | |
| Example 1 | 10.00 |
| Phase C | |
| Fragrance | 0.10 |

Example 9

High Gloss Lipstick

Castor oil, isononyl isononanoate, pentaerythrityl tetracaprylate/tetracaprate, octyldodecanol, lanolin oil, caprylic/capric/stearic triglyceride, candelilla wax, carnauba wax, polybutene H-100, ozokerite, lanolin wax, preservative, and antioxidant were all weighed and placed into a heated vessel. The temperature was raised to 85±3° C. The ingredients were stirred until they were melted and uniform.

The pearlescent pigment of Phase B was dispersed in the castor oil of Phase A then milled in either a colloid or roller mill. The dispersed pigment was then added and mixed with the remainder of Phase A. Fragrance from Phase C was then added and mixed with constant stirring. The composition was poured at 75±5° C., then molded, cooled and flamed into lipstick.

The resulting lipstick is characterized by a high-chroma lustrous, red-shade orange pearlescent appearance.

TABLE 8

Composition of the high gloss, colored lipstick

| Ingredients | Weight Fraction (%) |
|---|---|
| Phase A | |
| Castor Oil | (q.s to 100%) 15.36 |
| Isononyl Isononanoate | 17.51 |
| Pentaerythrityl TetraCaprylate/Tetracaprate | 8.75 |
| Octyldodecanol | 5.47 |
| Lanolin Oil | 11.93 |
| Caprylic/Capric/Stearic Triglyceride | 7.11 |
| Candelilla Wax | 9.30 |

TABLE 8-continued

Composition of the high gloss, colored lipstick

| Ingredients | Weight Fraction (%) |
|---|---|
| Carnauba Wax | 3.28 |
| Polybutene H-100 | 7.66 |
| Ozokerite | 2.20 |
| Lanolin Wax | 1.09 |
| Preservative | q.s. |
| Antioxidant | q.s. |
| Phase B | |
| Example 1 | 10.00 |
| Phase C | |
| Fragrance | 0.10 |

Example 10

Clear Gel Lip Gloss

Hydrogenated polyisobutene, ethylene/propylene/styrene copolymer, butylene/ethylene/styrene copolymer, ethylhexyl palmitate, tridecyl neopentanoate, isostearyl isostearate, and preservative were all weighed and placed into a heated vessel. The temperature was raised to 50±3° C. The ingredients were stirred until they were melted and uniform. At room temperature, pearlescent pigment of Phase B was added to Phase A and mixed until all the pearlescent pigment was well dispersed. Fragrance may be added if needed, and mixed with constant stirring. The composition was poured at room temperature.

The resulting lip gloss is characterized by a high-chroma red-shade orange pearlescent appearance with gold, red and green iridescent sparkling points depending on the viewing angle.

TABLE 9

Composition of the clear gel lip gloss

| Ingredients | Weight Fraction (%) |
|---|---|
| Phase A | |
| Hydrogenated Polyisobutene and Ethylene/Propylene/Styrene Copolymer and Butylene/Ethylene/Styrene Copolymer | 73.35 |
| Ethylhexyl Palmitate | 9.00 |
| Tridecyl Neopentanoate | 4.50 |
| Isostearyl Isostearate | 2.70 |
| Preservative | q.s. |
| Phase B | |
| Example 1 | 10.00 |

Prophetic Example 11

Nail Varnish

The cosmetic composition of a nail lacquer comprising a pearlescent pigment may be prepared from the components set forth in Table 10.

TABLE 10

Nail varnish

| Ingredients | Weight Fraction (%) |
|---|---|
| Nail polish base (Kirker Enterprises, Inc. of Patterson, NJ) | 94 |
| Example 1 | 6 |

Prophetic Example 12

Mascara

The cosmetic composition of a mascara comprising a pearlescent pigment may be prepared from the components set forth in Table 11.

TABLE 11

Mascara

| Ingredients | Amount (g) |
|---|---|
| Petroleum Distillate | 68 |
| Polyethylene | 12 |
| Dihydroabietyl alcohol | 5 |
| Candelilla wax | 2.4 |
| Aluminum stearate | 0.05 |
| Butylparaben | 0.1 |
| Black iron oxide | 4 |
| Example 1 | 8 |

Prophetic Example 13

Face Powder

The cosmetic composition of a face powder comprising a pearlescent pigment may be prepared from the components set forth in Table 12.

TABLE 12

Face Powder

| Ingredients | Amount (g) |
|---|---|
| Iron oxide | 6.57 |
| Zinc stearate | 4 |
| Titanium dioxide | 2 |
| Bismuth oxychloride | 10 |
| Nylon powder sold under the name "ORGASOL ®" by the company ATOCHEM | 20 |
| Vaseline oil | 3.26 |
| Oleyl alcohol | 0.6 |
| Isopropyl myristate | 0.43 |
| Propyl para-hydroxybenzoate | 0.12 |
| Example 1 | 20 |
| Talc qs. | 80 |

Prophetic Example 14

Eye Shadow

The cosmetic composition of an eye shadow comprising a pearlescent pigment may be prepared from the components set forth in Table 13.

TABLE 13

| Eye shadow | |
|---|---|
| Ingredients | Weight Fraction (%) |
| Talc | 49.75 |
| Titanium dioxide | 1 |
| Zinc stearate | 5 |
| Red iron oxide | 0.15 |
| Yellow iron oxide | 0.1 |
| Polyethylene | 3 |
| Magnanese violet | 5 |
| Example 1 | 25 |
| Mineral oil | 7 |
| Dimethicone fluid | 4 |

Prophetic Example 15

Blush

The cosmetic composition of a blush comprising a pearlescent pigment may be prepared from the components set forth in Table 14.

TABLE 14

| Blush | |
|---|---|
| Ingredients | Amount (g) |
| Zinc stearate | 3 |
| Titanium oxide | 2 |
| Iron oxide | 9 |
| Mica | 24 |
| Nylon powder sold under the name ORGASO ® by the company ATOCHEM | 15 |
| Example 1 | 5 |
| Vaseline oil | 3.26 |
| Oleyl alcohol | 0.6 |
| Isopropyl myristate | 0.43 |
| Propyl para-hydroxybenzoate | 0.12 |
| Talc qs. | 100 |

Prophetic Example 16

Hair and Body Gel

The cosmetic composition of a hair and body gel comprising a pearlescent pigment may be prepared from the components set forth in Table 15.

TABLE 15

| Hair and Body Gel | |
|---|---|
| Ingredients | Weight Fraction (%) |
| deionized water | 84 |
| Carbomer | 2 |
| Example 1 | 7.8 |
| Glycerin | 2.5 |
| Vinylpyrrolidone/vinyl actetate copolymer | 2.5 |
| Triethanolamine | 1 |
| Germaben-11 ® | 0.2 |

Prophetic Example 17

Lotion

The cosmetic composition of a lotion comprising a pearlescent pigment may be prepared from the components set forth Table 16.

TABLE 16

| Lotion | |
|---|---|
| Ingredients | Amount (g) |
| deionized water | 79.6 |
| Carbomer | 0.5 |
| Polysorbate | 0.8 |
| Propylene glycol | 2 |
| Glycerin | 5 |
| Triethanolamine | 0.6 |
| Example 1 | 2 |
| Acetylated lanolin alcohol | 3 |
| Cetyl alcohol | 2 |
| Stearic acid | 5 |
| LiquaPar ® | 0.5 |

Prophetic Example 18

Foundation

The cosmetic composition of a foundation comprising a pearlescent pigment may be prepared from the components set forth in Table 17.

TABLE 17

| Foundation | |
|---|---|
| Ingredients | Amount (g) |
| Glycerol stearate | 2.2 |
| Triglycerides of capric/caprylic acids sold under the name "MIGLYOL 812 ®" by the company DYNAMIT NOBEL | 15.0 |
| Yellow iron oxides | 0.75 |
| Brown iron oxides | 0.47 |
| Black iron oxide | 0.23 |
| Titanium dioxide | 4.55 |
| Methyl para-hydroxybenzoate | 0.1 |
| Propyl para-hydroxybenzoate | 0.1 |
| Imidazolidinyl urea | 0.3 |
| 2-hydroxy-4-methoxybenzophenone | 0.5 |
| Octyl N,N-dimethylparaaminobenzoate. | 0.5 |
| Pearlescent pigment | 3.0 |
| Aluminum and magnesium silicate sold under the name "VEEGUM ®"by the company VENDERBILT | 1.0 |
| Triethanolamine | 1.0 |
| Cellulose gum | 0.16 |
| Aluminum salt of the product of the reaction of octenylsuccinic anhydride with starch sold under the name "DRY FLO ®" by the company NATIONAL STARCH | 5.0 |
| Cyclomethicone sold under the name "VOLATIL SILICONE 7158 ®" by the company UNION CARBIDE | 10.0 |
| Water | 47.34 |
| Propylene glycol | 2.0 |
| Glycerin | 3.0 |
| Sodium salt of lauroylsarcosine sold under the name "ORAMIX L30 ®" by the company SEPPIC | 0.6 |
| Stearic acid | 2.2 |

What is claimed is:

1. A pearlescent pigment comprising a substrate, a first layer containing FeOOH, and a second layer containing $Fe_2O_3$ located between the substrate and the first layer, wherein the mass of the iron atoms of the first layer is from about 10 to about 20 weight percent of the pigment.

2. The pearlescent pigment of claim 1, wherein the substrate is selected from the group consisting of natural mica, synthetic mica, glass flakes, $Al_2O_3$ platelets, $SiO_2$ platelets, BiOCl, borosilicate, synthetic alumina, and boron nitride.

3. The pearlescent pigment of claim 1, wherein the substrate is natural mica, synthetic mica, or both.

4. The pearlescent pigment of claim 1, wherein the second layer has a mean thickness of about 10 nm to about 350 nm.

5. The pearlescent pigment of claim 1, wherein the color of the pigment prior to the coating of the first layer containing FeOOH has a CIELAB hue angle, $h_{ab}$, of from about 20 to about 65 degrees.

6. The pearlescent pigment of claim 1, wherein the pigment has a mean particle size from about 5 μm to about 750 μm.

7. The pearlescent pigment of claim 1, wherein the pigment has an outer protective coating.

8. The pearlescent pigment of claim 1, wherein the color of a homogeneous coating of the pigment, measured over a white background, has a CIELAB hue angle, $h_{ab}$, from about 40 to about 60 degrees, and the chroma value is greater than 50.

9. The pearlescent pigment of claim 1, wherein the HPI (hiding power index) of the pigment is greater than about 4.

10. A coating, ink, plastics, or cosmetic composition comprising the pigment of claim 1.

11. The composition of claim 10, further comprising a binder, wherein the pigment represents about 0.5% to about 99.5% of the composition.

12. The cosmetic composition of claim 10, wherein the cosmetic composition is selected from the group consisting of a nail polish, lipstick, lip gloss, mascara, body powder, face powder, eye shadow, hair gel, body gel, hair wash, body wash, lotion, and foundation.

13. The coating, ink, or plastics composition of claim 10, wherein the composition is a printing ink, surface coating, coatings for laser marking, pigment preparation, dry preparation, textile coating, or architectural coating.

14. An article comprising the pigment of claim 1.

15. The article of claim 14, wherein the pigment is in a coating layer.

16. A process for making a pearlescent pigment comprising:
providing a substrate coated with a second layer containing $Fe_2O_3$, followed by coating a first layer containing FeOOH on the second layer,
wherein the coating step of the first layer provides an iron mass from about 10 to about 20 weight percent of the pigment.

17. The process of claim 16, wherein the first layer is not heated to a temperature greater than about 300° C.

18. The process of claim 16, further comprising preparing a suspension of the substrate coated with the second layer containing $Fe_2O_3$, an iron salt, and increasing the pH of the suspension.

19. The process of claim 18, wherein the suspension additionally comprises urea.

20. The process of claim 18, wherein the iron salt is one or more Fe(III) halide.

21. The process of claim 18, wherein the final pH is from about 6 to about 8.

22. The process of claim 17, wherein the substrate coated with the second layer containing $Fe_2O_3$, prior to coating the first layer of FeOOH, has a CIELAB hue angle, $h_{ab}$, of from about 20 to about 65 degrees.

23. A process for making a pearlescent pigment comprising:
providing a substrate coated with a second layer containing $Fe_2O_3$, followed by coating a first layer containing FeOOH on the second layer, and
preparing a suspension of the substrate coated with the second layer containing $Fe_2O_3$, an iron salt, and increasing the pH of the suspension.

24. The process of claim 23, wherein the suspension additionally comprises urea.

25. The process of claim 23, wherein the iron salt is one or more Fe(III) halide.

26. The process of claim 23, wherein the final pH is from about 6 to about 8.

27. A process for making a pearlescent pigment comprising:
providing a substrate coated with a second layer containing $Fe_2O_3$, followed by coating a first layer containing FeOOH on the second layer,
wherein the first layer is not heated to a temperature greater than about 300° C.

28. The process of claim 27, wherein the substrate coated with the second layer containing $Fe_2O_3$, prior to coating the first layer of FeOOH, has a CIELAB hue angle, $h_{ab}$, of from about 20 to about 65 degrees.

* * * * *